Patented Jan. 22, 1935

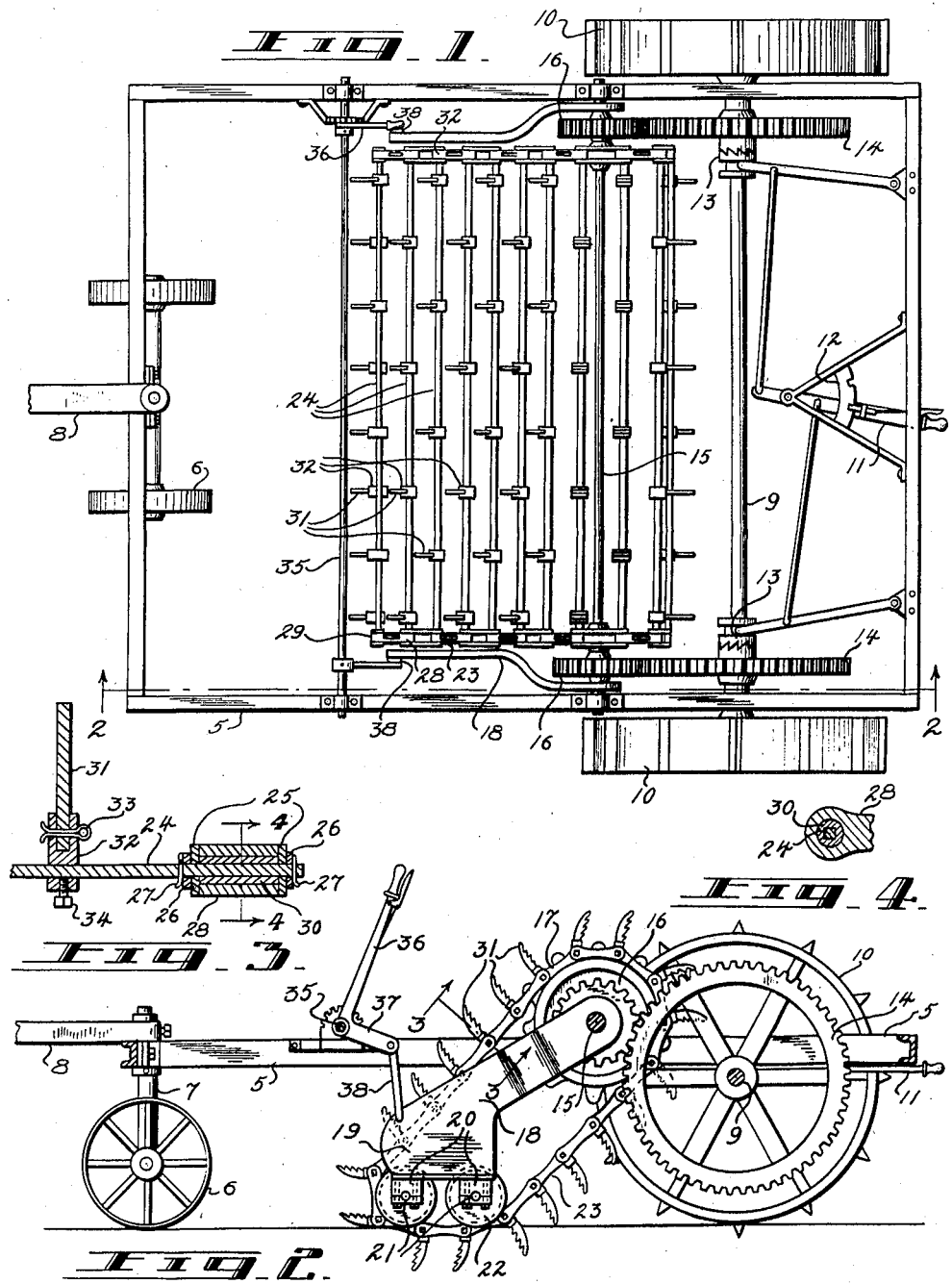

1,988,972

UNITED STATES PATENT OFFICE 1,988,972

WEED DESTROYER

Duncan Hector McDonald, Dauphin, Manitoba, Canada

Application November 30, 1932, Serial No. 645,050

3 Claims. (Cl. 97—10)

My present invention relates to improvements in a weed destroyer and appertains particularly to a device of this kind wherein travelling harrow teeth scratch the ground against the movement of the implement tearing out grass, weeds and roots.

An object of the invention is to provide a weed destroyer having ground scratching teeth on cross rods of endless chains and so mounted as to thoroughly comb the surface of the soil being covered.

A further object of the invention is to provide a weed destroyer designed to treat or act on a considerable area at the one time, the operative travel of the ground scratching teeth being extended in a novel way.

A further object of the invention is to provide a weed destroyer whose ground engaging element is horizontally pivoted for vertical adjustment and in use is motivated by traction wheels on the implement.

A still further object of the invention is the provision of an implement of the nature and for the purposes described that is characterized by structural simplicity, durability, efficient operation and low cost of production whereby the same is rendered commercially desirable.

To the accomplishment of these and related objects as shall become apparent as the description proceeds, my invention resides in the construction, combination and arrangement of parts as shall be hereinafter more fully described, illustrated in the accompanying drawing and pointed out in the claims hereunto appended.

The invention will be best understood and can be more clearly described when reference is had to the drawing forming a part of this disclosure wherein like characters indicate like parts throughout the several views.

In the drawing:—

Figure 1 is a plan view;

Figure 2 is a sectional elevation as taken on the line 2—2 of Figure 1;

Figure 3 is a section of the tooth carrying chain structure as taken on the line 3—3 of Figure 2; and Figure 4 is a further detail section thereof on the line 4—4 of Figure 3.

The main frame 5 is supported at the front by a pivotally mounted wheeled truck 6 to whose vertical post 7 the draft tongue 8 fastens. The back of the frame 5 is carried on a rotatable axle 9 mounting the large traction wheels 10 on the outer opposite ends thereof. A manually set lever 11 working on a segment 12 carried by the frame 5 operates one-way clutches 13 that each engage a large gear wheel 14 riding on the axle 9 just within the sides of the frame 5.

Forward of the axle 9 a shaft 15 is rotatably journalled on the frame 5 and provided near each end with a pinion 16 to engage respectively with the pair of gear wheels 14 on the axle 9. Just within these pinions 16 are a pair of sprocket wheels 17 while between the pinions 16 and the outer ends of the shaft 15 journalled on the frame are pivoted a pair of opposite and inwardly offset arms 18 that normally extend forwardly and downwardly at approximately 45° and whose flat shoe-like lower ends 19, in such position, are horizontal. On the bottom of the lower ends 19 of each of these offset pivoted arms 18 are a pair of journal boxes 20 that carry a longitudinally spaced parallel pair of horizontal shafts 21 near the outer ends of both of which are flanged idler wheels 22 in line with the sprockets 17 and adapted to carry a pair of endless chains 23 united by square cross bars 24. These chains are made up of inside and outside links, the outside links 25 having square perforations that non-rotatably receive the cross bars 24 and by washers 26 and cotter pins 27 confine between spaced pairs of them the integral inside links 28, slotted centrally as at 29 to receive the teeth of the sprocket wheels 17, and that include transverse cylindrical bores near each end to receive bearing sleeves 30 that rotate or rock in them and have square central openings that fit snugly on the square bars 24.

The soil treating or ground scratching teeth 31 are saw toothed knives whose inner ends seat tightly in sockets 32 and are there retained by transverse split or cotter pins 33; the sockets 32 having square perforations that fit on the square cross bars 24 and when properly arranged and positioned thereon are locked in place by the set screw 34.

A transverse shaft 35 oscillates on the frame 5 and can be set in any desired position by a segment engaging hand lever 36. A radially extending arm 37 occurs on this shaft 35 near each end and from these arms links 38 connect with the upper side of the forward lower end of the chain idler arms 18 so that on the adjustment of the lever 36 the shoed arms 18 are raised or lowered as found advantageous or necessary.

As the design and structural arrangement of this weed destroyer has thus been set forth in detail, it should suffice in conclusion to make but brief reference to its use and modus operandi: When the implement has been drawn to the field where the weed cleaning work is to be done, the lever 36 is adjusted to lower the chain carrying idlers and the lower end of the ground scratching mechanism to the desired depth and the clutches 13 moved into engagement so that as the implement is advanced over the land, the traction wheels 10 rotate the axle 9 and with it the gear wheels 14 that drive the pinions 16 and their shaft 15 that operates the chain carried ground scratching teeth 31 that move through the top soil against the action of the machine and for a considerable distance due to the spacing of the idlers 22 over which the chains run so that the ground covered is thoroughly combed and all the weeds and roots, particularly those with wide spreading hairs or creeping tendrills are torn out of the earth and loosely dropped again to wither and die or be raked or otherwise collected and destroyed.

From the foregoing description taken in connection with the accompanying drawing, it will be manifest that a weed destroyer is provided that will fulfill all the necessary requirements of such a device but as many changes could be made in the above description and many apparently widely different embodiments of my invention may be constructed within the scope of the appended claims without departing from the spirit or scope thereof, it is intended that all matters contained in the said accompanying specification and drawing shall be interpreted as illustrative and not in a limitative or restrictive sense.

Having thus described my invention, what I claim as new and desire to secure by Letters Patent is:—

1. A weed destroyer comprising a frame, a pair of traction wheels supporting the same, an axle for said traction wheels, clutch controlled driving gears on said axle, a transverse shaft on said frame, pinions thereon meshed with said driving gears, sprockets keyed to and a vertically adjustable frame with a longitudinally extended lower end pivoting on said shaft, idlers on the said longitudinally extended lower end of said adjustable frame and an endless chain ground scratching device travelling over said sprockets and idlers.

2. A weed destroyer comprising a frame, a pair of traction wheels supporting the same, a transverse shaft on said frame rotatable by said traction wheels, sprockets keyed to and an upwardly offset vertically adjustable frame with a longitudinally extended lower end pivoting outwardly of said sprockets on said shaft, a pair of longitudinally spaced longitudinally aligned idlers on each side of the longitudinally extended lower end of said adjustable frame, parallel endless chains running over said sprockets and aligned idlers, non-rotatable members between said chains and adjustable and removable ground scratching devices on said members.

3. A weed destroyer comprising a frame, a pair of traction wheels supporting the same, a transverse shaft on said frame rotatable by said traction wheels, sprockets keyed to and a vertically adjustable frame pivoting on said shaft, a pair of longitudinally spaced parallel idlers on each side of the lower end of said adjustable frame, parallel endless chains running over said sprockets and spaced idlers, square and non rotatable cross bars between said chains, movable sockets on said cross bars and saw toothed weed combing teeth removably carried in said sockets.

DUNCAN HECTOR McDONALD. [L. S.]